US012568171B2

(12) United States Patent
Murphy et al.

(10) Patent No.: US 12,568,171 B2
(45) Date of Patent: Mar. 3, 2026

(54) PREDICTIVE ANALYTICS FOR MANAGING CALLBACKS QUEUES

(71) Applicant: The ADT Security Corporation, Boca Raton, FL (US)

(72) Inventors: Justin Patrick Murphy, Knoxville, TN (US); Chad Martin Kerby, Wichita, KS (US)

(73) Assignee: The ADT Security Corporation, Boca Raton, FL (US)

( * ) Notice: Subject to any disclaimer, the term of this patent is extended or adjusted under 35 U.S.C. 154(b) by 133 days.

(21) Appl. No.: 18/645,087

(22) Filed: Apr. 24, 2024

(65) Prior Publication Data

US 2025/0337840 A1 Oct. 30, 2025

(51) Int. Cl.
*H04M 3/523* (2006.01)
(52) U.S. Cl.
CPC ................................ *H04M 3/5231* (2013.01)
(58) Field of Classification Search
CPC ................................................... H04M 3/5231
USPC ...................................... 379/266.01
See application file for complete search history.

(56) References Cited

U.S. PATENT DOCUMENTS

| | | | |
|---|---|---|---|
| 7,428,303 B2 | 9/2008 | Campbell et al. | |
| 8,781,092 B2 | 7/2014 | Noble, Jr. | |
| 8,938,221 B2 | 1/2015 | Brazier et al. | |
| 9,031,223 B2 | 5/2015 | Smith et al. | |
| 10,284,723 B1 | 5/2019 | Neuer, III et al. | |
| 10,582,060 B1 * | 3/2020 | Merritt ..................... G06N 5/01 | |
| 11,176,461 B1 | 11/2021 | Merritt | |
| 2006/0167729 A1 * | 7/2006 | Rafter ................ G06Q 10/1093 |
| | | | 705/7.19 |

FOREIGN PATENT DOCUMENTS

CN 107231496 B 1/2020

OTHER PUBLICATIONS

Squaretalk Ltd. "Queue Callback in Contact Centers—The Complete Guide"; Jan. 26, 2024, consisting of 8 pages.

* cited by examiner

*Primary Examiner* — Amal S Zenati
(74) *Attorney, Agent, or Firm* — Weisberg I.P. Law, P.A.

(57) ABSTRACT

Systems and methods for callback queue management are provided. An example system is configured to determine a maximum size of a callback queue based on a formula. The system determines eligibility of an inbound query for the callback queue based on a current number of calls in the callback queue being less than the maximum size. The system causes a callback call associated with the inbound query to be performed based on the inbound query being eligible for the callback queue.

20 Claims, 6 Drawing Sheets

| Interval | Calls | ACDTime | EWTTIME | STAFFED | ADJUST | Delta |
|---|---|---|---|---|---|---|
| 8:00 | 9 | 472 | 0 | 20.7 | -0.01 | 7.1 |
| 8:30 | 24 | 819 | 1319 | 42.3 | -2.68 | 3 |
| 9:00 | 23 | 799 | 730 | 68.18 | 0 | 7.22 |
| 9:30 | 34 | 507 | 250 | 93.85 | 0 | 20.08 |
| 10:00 | 29 | 468 | 39 | 120.46 | -3.33 | 37.43 |
| 10:30 | 38 | 678 | 0 | 133.2 | -6.81 | 30.2 |
| 11:00 | 31 | 726 | 29 | 142.13 | 0 | 30.5 |
| 11:30 | 23 | 678 | 37 | 156.92 | 0 | 35.55 |
| 12:00 | 35 | 403 | 823 | 163.71 | 0 | 21.63 |
| 12:30 | 52 | 667 | 958 | 166 | -20 | 14.56 |
| 1:00 | 69 | 475 | 1277 | 173 | -25 | 13.68 |
| 1:30 | 64 | 1021 | 1265 | 180 | -30 | 10.63 |
| 2:00 | 45 | 565 | 1124 | 175 | -40 | 12.95 |
| 2:30 | 64 | 591 | 1581 | 159.51 | -33.92 | 9.37 |
| 3:00 | 61 | 600 | 445 | 155 | -15.32 | 24.06 |
| 3:30 | 0 | 900 | 0 | 155 | -15.32 | 27.94 |

FIG. 3

PREDICTIVE ANALYTICS FOR MANAGING CALLBACKS QUEUES

TECHNICAL FIELD

The present technology is generally related to callback queue management.

BACKGROUND

Existing customer service operations may implement a callback queue. Customers in such a queue may wait for a callback from the customer service operator, e.g., a human agent, without having to remain on the phone while waiting.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 3 is a chart of example values relating to the determination of the maximum size of the callback queue according to some embodiments of the present disclosure;

DETAILED DESCRIPTION

Figure 1:
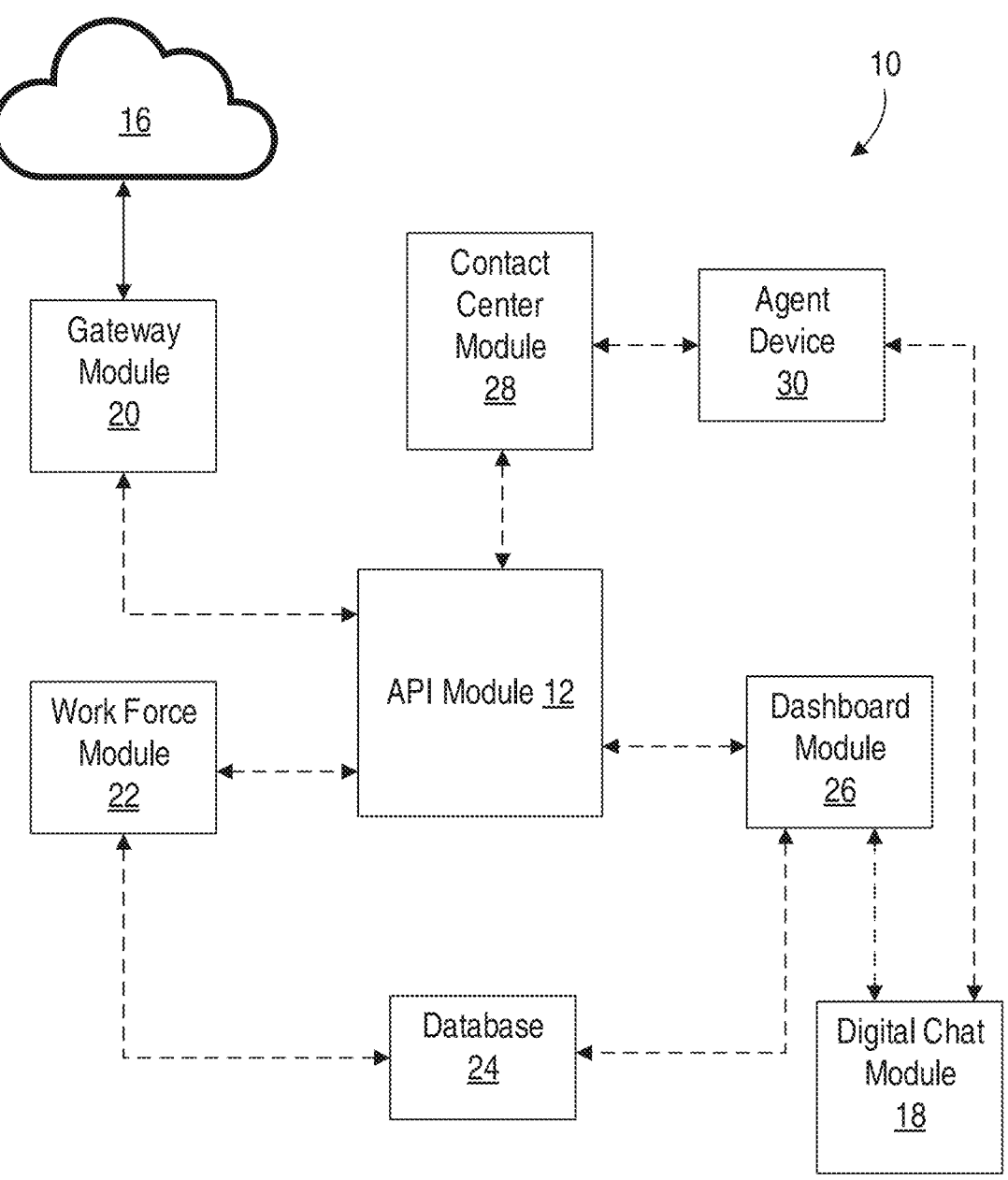
FIG. 1 is a block diagram of an example architecture according to some embodiments of the present disclosure.

With reference to FIG. 1, there is shown a diagram of an example system 10. An Application Programming Interface (API) module 12 is in communication with one or more of the components of the system 10 for callback queue management. In embodiments described herein, the joining term "in communication with" and the like may be used to indicate electrical or data communication, which may be accomplished by physical contact, induction, electromagnetic radiation, radio signaling, infrared signaling, or optical signaling, for example. The arrows between the various components of the system 10 shown in FIG. 1 demonstrate example communication between the respective modules, each of which will be discussed in turn.

System 10 may be configured to facilitate customer support services and management thereof. For example, system 10 may be configured to receive customer queries received in the form of, e.g., phone calls and/or digital messages, such as chat messages.

The system 10 may include a gateway module 20 configured to provide an interface between the system 10 and a network 16, such as a phone network and attendant infrastructure. Inbound customer queries, such as phone queries, may originate from and/or utilize the network. The gateway module 20 may comprise, e.g., a session border controller.

The system 10 may include a digital chat module 18. Inbound customer queries, such as digital messages (e.g., chat messages), may be received via the digital chat module 18. Customers may communicate with a customer support agent by way of the digital chat module 18.

The system 10 may include a dashboard module. The dashboard module 26 is configured to facilitate the generation of reports pertaining to system 10 operations and to monitor and/or control the system 10, including in relation to callback queue management.

The system 10 may include a work force module 22. The work force module 22 is configured to gather and/or store data pertaining to staffing, such as of customer support agents.

The system may include a contact center module 28. The contact center module 28 performs callbacks according to the callback queue, as described herein. The contact center module also facilitates communication with customers via, e.g., agent devices 30. For example, a customer support agent may use an agent device 30, such as a phone, computer, and/or other suitable communications hardware, to receive inbound queries (e.g., phone calls and messages via the gateway module 20) or to place outbound calls, such as callbacks.

The system 10 may include a database 24 configured to store data, e.g., relating to callback queue management and/or for coordinating callback activity.

Figure 2:
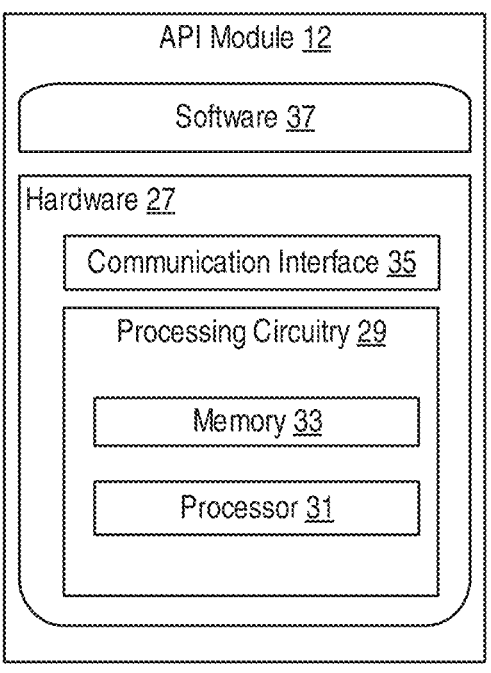
FIG. 2 is a block diagram of an example API module of FIG. 1 according to some embodiments of the present disclosure.

FIG. 2 shows a block diagram illustrating an example API module 12 according to one or more embodiments. The API module 12 comprises hardware 27, which may include processing circuitry 29. The processing circuitry 29 may include one or more processors 31 and one or more memories 32. Each processor 31 may include and/or be associated with one or more central processing units, data buses, buffers, and interfaces to facilitate operation. In addition to or instead of a processor 31 and memory 33, the processing circuitry 29 may comprise other types of integrated circuitry that perform various functionality. Integrated circuitry may include one or more processors 31, processor cores, field programmable gate arrays (FPGAs), application-specific integrated circuits (ASICs), graphics processing units (GPUs), systems on chips (SoCs), or other components configured to execute instructions. The processor 31 may be configured to access (e.g., write to and/or read from) memory 33, which may comprise any kind of volatile and/or nonvolatile memory, e.g., cache, buffer memory, random access memory (RAM), read-only memory (ROM), optical memory, and/or erasable programmable read-only memory (EPROM). Further, memory may be embodied in the form of one or more storage devices. The processing circuitry 29 may be configured to perform various functionality described herein. For example, computer instructions may be stored in memory 33 and/or another computer-readable medium that, when executed by processor 31 causes the processor 31 to perform various functionality described herein.

Hardware 27 may include communication interface 35 facilitating communication between API module 12 and one or more elements described above.

API module 12 further has software 37 (which may include one or more software applications) stored internally in, for example, memory 33, or stored in external memory (e.g., database, storage array, network storage devices, etc.) accessible by the API module 12 via an external connection. Software 37 may include any software or program that configures processing circuitry 29 to perform the steps or processes of the present disclosure.

The processing circuitry 29 may be configured to control any of the methods and/or processes described herein and/or to cause such methods, and/or processes to be performed, e.g., by API module 12. Processor 31 corresponds to one or more processors 31 for performing API module 12 functions described herein. The memory 33 is configured to store data and/or files and/or other information/data. In some embodiments, the software 37 may include instructions that, when executed by the processor 31 and/or processing circuitry 29, causes the processor 31 and/or processing circuitry 29 to perform the processes described herein with respect to API module 12. Accordingly, by having computer instructions stored in memory 33 accessible to the processor 31, the processor 31 may be configured to perform the actions described herein.

In some embodiments, the API module 12 is configured to accept inbound traffic, e.g., inbound customer queries from the gateway module 20 and/or dashboard module 26. The API module 12 determines the eligibility of each inbound query for a callback. The API module 12 may use the following formula:

$$\Delta = \sum \frac{(E + A)(Ix)}{(\sigma \pm \alpha)}$$

where:
  $\Delta$ is the maximum size of the callback queue, including the maximum number of calls that are permitted or forecasted based on an interval;
  E is an expected or average wait time a customer waits before speaking to a customer support agent;
  A is an average talk time or the average time a customer support agent speaks with a customer;
  I is an interval for summarizing data used to determine the total number of eligible callbacks allowed;
  x is a control variable corresponding to a weight of the total number of eligible calls given an observed interval;
  $\sigma$ is a staff capacity corresponding to a total number of queries a group of customer support agents can receive over an observed interval; and
  $\alpha$ is an adjustment value relating to the original staffing variable metric, which can deviate given sudden or unexpected changes in staffing, given the interval observed.

The values for one or more of these variables may be obtained from or determined based on data from the work force module 22. FIG. 3 shows a table of example values and the associated maximum size of the callback queue.

In at least one embodiment where the inbound query is a voice call from a customer, e.g., from a telecommunications network via a mobile phone or landline, the inbound query is received from the network 16 at the gateway module 20. The gateway module 20 notifies the API module 12 of the inbound query. The API module 12 determines whether the inbound query is eligible for a callback based on the formula described above, as well as whether the inbound query is received during operating business hours for customer support agents, whether the caller (e.g., customer) already has a scheduled callback, whether a maximum number of inbound queries allowed to be routed to customer support agents has been reached, and whether the number of inbound queries in the callback queue has reached the maximum size of the callback queue. If the number of inbound queries in the callback queue has reached the maximum size of the callback queue, the inbound query is forwarded to the contact center module 28 to be handled by a customer support agent, e.g., via a customer support agent device 30. If the number of inbound queries in the callback queue is less than the maximum size of the callback queue, the customer may be presented with the option to choose to be queued for a callback by a customer support agent. The customer may be presented with, e.g., a pre-recorded or machine-generated message informing the customer of an estimated callback window (e.g., informing the customer that the callback will be received in 15 to 30 minutes). In some embodiments, the customer may receive an indication, e.g., a Short Message Service (SMS) message, confirming that the callback is scheduled and/or notifying the customer when the callback is approaching (e.g., five minutes in advance).

In at least one embodiment where the inbound query is a communication from a customer via the digital chat module 18, e.g., in the form of an online chat or phone call, a customer support agent may facilitate scheduling of the callback using the agent device 30. The customer support agent may ask the customer whether a callback is desired, including whether an SMS message, such as an SMS message described above, is desired. If the customer opts for a callback, the callback may be scheduled using the dashboard module 26. The API module 12 determines callback eligibility. In addition to determining eligibility based on a current status of the callback queue, as described above, the API module 12 may determine eligibility during a future callback window. For example, each day (beginning with the current day and extending into future days) may be divided into categories by time, such as "morning," "afternoon," and "evening." Within each category, a number of future callback windows may be evaluated. For example, in the case of "morning," there may be multiple one-hour future callback windows. The API module 12 determines (e.g., predicts) using the above-described formula whether the inbound query will be eligible for a callback during a future window selected using the agent device 30, e.g., as specified by a customer. In some embodiments, the API module 12 may use historical data to determine whether the inbound query is eligible for the callback queue during the future callback window, such as callback queue size and/or conditions, or past values for the variables described above. In some embodiments, the historical data may be based on similar windows, e.g., the same day of the week or time of day. If the inbound query is determined to be eligible for a future callback window, the callback may be scheduled. In some embodiments, the customer may receive an indication, e.g., a Short Message Service (SMS) message confirming the callback is scheduled and/or notifying the customer when the callback is approaching (e.g., five minutes in advance).

Figure 4:
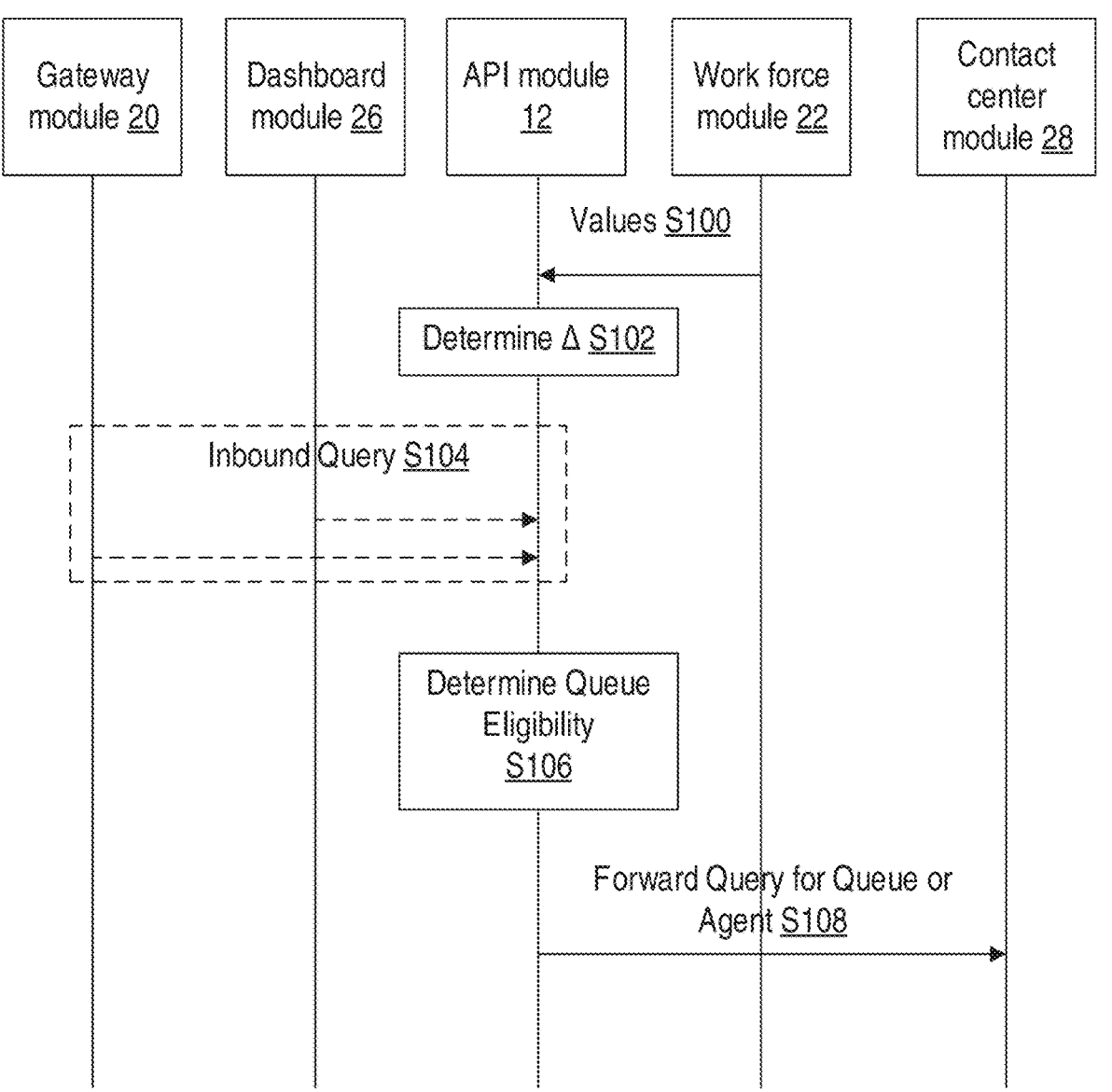
FIG. 4 is a sequence diagram of example functionality performed by one or more entities of FIGS. 1 and 2 according to some embodiments of the present disclosure.

With reference to FIG. 4, shown is a sequence diagram depicting an example of determining queue eligibility. Beginning at block S100, the values for variables in the formula may be obtained by the API module 12 from the work force module 22 (Block S100). The API module may then determine a maximum callback queue, e.g., corresponding to a requested time interval. (Block S102). Next, an inbound query is received by the API module from the gateway module and/or dashboard module (Block S104). The API module may then determine whether the inbound query is eligible for the callback queue (Block S106). Based on the determination, the inbound query is then forwarded to the contact center module 28 to be forwarded to a customer support agent (e.g., via the agent device 30) or scheduled for a callback (Block S108).

Figure 5:
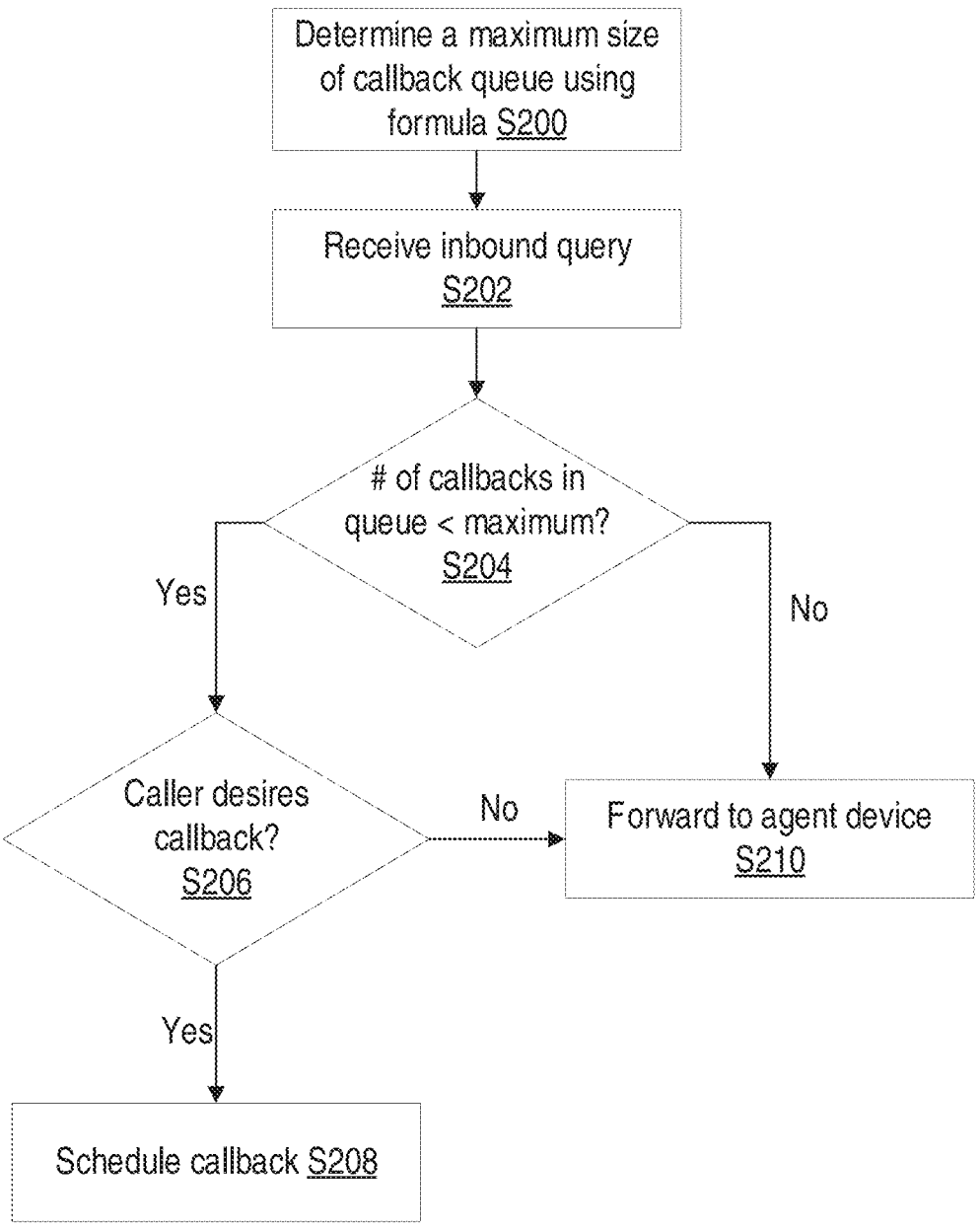
FIG. 5 is a flowchart of example functionality performed by an API module according to some embodiments of the present disclosure.

FIG. 5 is a flowchart of an example process implemented by API module 12 (including by one or more of processing circuitry 29, and processor 31) according to some embodiments of the present disclosure. Beginning at block S200, API module 12 determines a maximum size of a callback queue, as described herein (Block S200). The API module 12 may then receive an inbound query (Block S202). Then, the API module 12 may determine whether the number of callbacks in the queue is less than the maximum size of the callback queue (Block S204). If the number of callbacks in the queue is less than the maximum size of the callback queue, then the caller is presented with the option of whether a callback is desired (Block S206). If a callback is desired, one is scheduled (Block S208). If not, or if the number of callbacks in the queue is not less than the maximum size of the callback queue, the inbound query is forwarded to an agent device 30 (Block S210).

Figure 6:
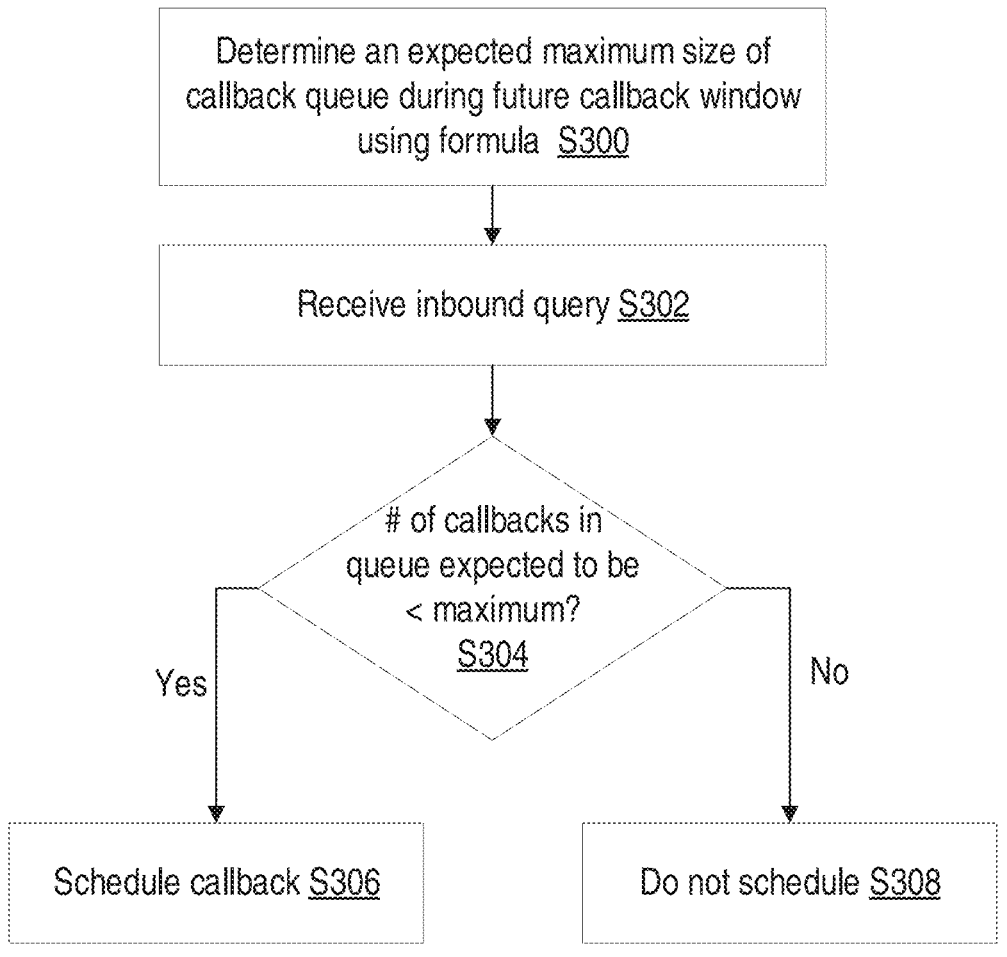
FIG. 6 is a flowchart of additional example functionality performed by an API module according to some embodiments of the present disclosure.

FIG. 6 is a flowchart of an example process implemented by API module 12 (including by one or more of processing circuitry 29, and processor 31) according to some embodiments of the present disclosure. Beginning at S302, API module 12 determines an expected maximum size of a callback queue during a future callback window, as described herein (Block S300). The API module 12 then receives an inbound query (Block S302). Then, the API module 12 determines whether the number of callbacks in the queue is expected to be less than the maximum size of the callback queue, e.g., at a future time (Block S304). If the number of callbacks in the queue is expected to be less than the maximum size of the callback queue, the callback is scheduled for the future callback window (Block S306). Otherwise, if the number of callbacks in the queue is not expected to be less than the maximum size of the callback queue the callback is not scheduled (Block S308).

The concepts described herein may be embodied as a method, data processing system, computer program product and/or computer storage media storing an executable computer program. Accordingly, the concepts described herein may take the form of an entirely hardware embodiment, an entirely software embodiment, or an embodiment combining software and hardware aspects. Any process, step, action and/or functionality described herein may be performed by, and/or associated to, a corresponding module and/or unit, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer, and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:
1. A system, comprising:
   at least one processor; and
   at least one memory storing a plurality of instructions that, when executed by the at least one processor, cause the at least one processor to:

determine a maximum size of a callback queue based on an formula given as:

$$\Delta = \sum \frac{(E+A)(Ix)}{(\sigma \pm \alpha)}$$

where:

$\Delta$ is the maximum size of the callback queue;

E is an expected wait;

A is an average talk time;

I is an interval;

x is a control variable;

$\sigma$ s a staff capacity; and $\alpha$ is an adjustment value;

determine that an inbound query is eligible for the callback queue based on a current number of calls in the callback queue being less than the maximum size;

in response to the inbound query being eligible for the callback queue, determine at least one callback window;

cause a callback call associated with the inbound query to be performed within the at least one callback window; and recalculate the maximum size according to a time interval.

2. The system of claim 1, wherein the plurality of instructions is further configured to cause the at least one processor to:

determine at least one future callback window;

determine an expected number of calls in the callback queue during the future callback window; and determine an expected maximum size of the callback queue during the callback window, the expected maximum size being calculated based on the formula;

determine that the inbound query is eligible for the callback queue during the future callback window based on the expected number of calls being less than the expected maximum size; and cause a callback call associated with the inbound query to be performed within the future callback window.

3. A system, comprising:

at least one processor; and at least one memory storing a plurality of instructions that, when executed by the at least one processor, cause the at least one processor to:

determine a maximum size of a callback queue based on an formula given as:

$$\Delta = \sum \frac{(E+A)(Ix)}{(\sigma \pm \alpha)}$$

where:

$\Delta$ is the maximum size of the callback queue;

E is an expected wait;

A is an average talk time;

I is an interval;

x is a control variable;

$\sigma$ is a staff capacity; and $\alpha$ is an adjustment value; and determine eligibility of an inbound query for the callback queue based on a current number of calls in the callback queue being less than the maximum size; and cause a callback call associated with the inbound query to be performed based on the inbound query being eligible for the callback queue.

4. The system of claim 3, wherein the plurality of instructions is further configured to cause the at least one processor to determine eligibility of the inbound query for the callback queue by at least determining the inbound query is ineligible for the callback queue based on the current number of calls in the callback queue not being less than the maximum size.

5. The system of claim 3, wherein the plurality of instructions is further configured to cause the at least one processor to:

determine at least one callback window; and cause a callback call associated with the inbound query to be performed within the at least one callback window.

6. The system of claim 3, wherein the plurality of instructions is further configured to cause the at least one processor to determine that the inbound query is eligible for the callback queue during at least one future callback window based on an expected number of calls being less than an expected maximum size of the callback queue during the at least one future callback window.

7. The system of claim 6, wherein the plurality of instructions is further configured to cause the at least one processor to determine, based on historical data, for the at least one future callback window, the expected number of calls in the callback queue during the at least one future callback window.

8. The system of claim 6, wherein the plurality of instructions is further configured to cause the at least one processor to determine the expected maximum size based on the formula.

9. The system of claim 6, wherein the plurality of instructions is further configured to cause the at least one processor to cause a callback call associated with the inbound query to be performed during the at least one future callback window.

10. The system of claim 3, wherein the plurality of instructions is further configured to cause the at least one processor to recalculate the maximum size according to a time interval.

11. The system of claim 6, wherein the plurality of instructions is further configured to cause the at least one processor to:

determine the inbound query is ineligible for the callback queue based on the current number of calls in the callback queue not being less than the maximum size; and based on the inbound query being ineligible for the callback queue, cause the inbound query to be forwarded to an agent device.

12. A method implemented in a system, the method comprising:

determining a maximum size of a callback queue based on an formula given as: $\Delta =$ $$\sum \frac{(E+A)(Ix)}{(\sigma \pm \alpha)}$$

where:

$\Delta$ is the maximum size of the callback queue;

E is an expected wait;

A is an average talk time;

I is an interval;

x is a control variable;

$\sigma$ is a staff capacity; and

α is an adjustment value; and determining eligibility of an inbound query for the callback queue based on a current number of calls in the callback queue being less than the maximum size; and causing a callback call associated with the inbound query to be performed based on the inbound query being eligible for the callback queue.

13. The method of claim 12, further comprising determining eligibility of the inbound query for the callback queue by at least determining the inbound query is ineligible for the callback queue based on the current number of calls in the callback queue not being less than the maximum size.

14. The method of claim 12, further comprising:

determining at least one callback window; and causing a callback call associated with the inbound query to be performed within the at least one callback window.

15. The method of claim 12, further comprising determining that the inbound query is eligible for the callback queue during at least one future callback window based on an expected number of calls being less than an expected maximum size of the callback queue during the at least one future callback window.

16. The method of claim 15, further comprising determining, based on historical data, for the at least one future callback window, the expected number of calls in the callback queue during the at least one future callback window.

17. The method of claim 15, further comprising determining the expected maximum size based on the formula.

18. The method of claim 15, further comprising causing a callback call associated with the inbound query to be performed during the at least one future callback window.

19. The method of claim 12, further comprising recalculating the maximum size according to a time interval.

20. The method of claim 15, further comprising:

determining the inbound query is ineligible for the callback queue based on the current number of calls in the callback queue not being less than the maximum size; and based on the inbound query being ineligible for the callback queue, causing the inbound query to be forwarded to an agent device.

\* \* \* \* \*